US007844733B2

(12) United States Patent
Betts et al.

(10) Patent No.: US 7,844,733 B2
(45) Date of Patent: Nov. 30, 2010

(54) CONTENT ROUTER WITH MULTIPLE FORWARDING ELEMENTS INSTANTIATED ON HARDWARE ENTITIES

(75) Inventors: Craig Betts, Kanata (CA); David Pochopsky, Ottawa (CA); Martin Barnes, Kanata (CA); Greg Bertin, Ottawa (CA); Peter Ashton, Nepean (CA); Wayne Burwell, Ottawa (CA)

(73) Assignee: Solace Systems, Inc., Ottawa, Ontario (CA)

( * ) Notice: Subject to any disclaimer, the term of this patent is extended or adjusted under 35 U.S.C. 154(b) by 1373 days.

(21) Appl. No.: 11/012,169

(22) Filed: Dec. 16, 2004

(65) Prior Publication Data

US 2005/0137998 A1 Jun. 23, 2005

Related U.S. Application Data

(60) Provisional application No. 60/530,679, filed on Dec. 19, 2003.

(51) Int. Cl.
*G06F 15/173* (2006.01)
(52) U.S. Cl. .......................... 709/242; 709/241; 707/2; 707/4; 707/102; 370/390; 370/393; 718/105
(58) Field of Classification Search ................. 709/241, 709/242, 244; 370/390, 393; 707/1, 755, 707/756, 791, 802, 2, 4, 102; 718/105
See application file for complete search history.

(56) References Cited

U.S. PATENT DOCUMENTS 6,021,443 A    2/2000  Bracho et al.
6,091,724 A    7/2000  Chandra et al.
2002/0112058 A1 *  8/2002  Weisman et al. ............ 709/227
2002/0138582 A1 *  9/2002  Chandra et al. ............. 709/206
2002/0198974 A1 * 12/2002  Shafer ........................ 709/223
2003/0099237 A1    5/2003  Mitra et al.
2004/0078450 A1 *  4/2004  Chen et al. .................. 709/214
2004/0117428 A1 *  6/2004  Surma et al. ................ 709/200
2004/0215667 A1 * 10/2004  Taylor et al. ................ 707/201
2005/0091589 A1 *  4/2005  Ramarao ..................... 715/522
2005/0108722 A1 *  5/2005  Salomon et al. ............ 719/310
2006/0253745 A1 * 11/2006  Maso et al. ................... 714/47

OTHER PUBLICATIONS

Carzaniga, A. et al. "A Routign Scheme for Content-Based Networking"; University of Colorado, Department of Computer Science, Technical Report; Jun. 2003; Boulder, Colorado, USA.
Arbouzov, Leonid et al. "Extensible Markup Language (XML) 1.0 (Third Edition)"; Feb. 4, 2004; W3C.
Arbouzov, Leonid et al. "Extensible Markup Language (XML) 1.1"; Apr. 15, 2004; W3C.
"XML Path Language (XPath) Version 1. 0"; Nov. 16, 1999; W3C.

* cited by examiner

*Primary Examiner*—Thuong T Nguyen
(74) *Attorney, Agent, or Firm*—Marks & Clerk; Richard J. Mitchell

(57) ABSTRACT

A carrier grade content router, includes a distinct management plane for housing externally visible management applications, and coordinating and relaying external management requests to appropriate underlying application code in the router; a distinct control plane for running control protocols required within an XML routed network; and a distinct data plane for receiving and forwarding customer data. Some functions can be implemented in software or via a hardware accelerator.

7 Claims, 4 Drawing Sheets

CONTENT ROUTER WITH MULTIPLE FORWARDING ELEMENTS INSTANTIATED ON HARDWARE ENTITIES

CROSS REFERENCE TO RELATED APPLICATION

This application claims the benefit under 35 USC 119(e) or prior U.S. provisional application Ser. No. 60/530,676 filed Dec. 19, 2003, the contents of which are incorporated herein by reference.

FIELD OF THE INVENTION

This invention relates to the field of implicit or content routing in digital communications networks, and in particular a carrier grade content router, such as an XML router.

BACKGROUND OF THE INVENTION

Content routing is described in A. Carzaniga, M. J. Rutherford, A. L. Wolf; A routing scheme for content-based networking, Department of Computer Science, University of Colorado, June 2003, the contents of which are herein incorporated by reference.

The field of "Implicit Routing" (or "content routing") is an emerging networking technology. Implicit routing is the act of forwarding customer data based on the content, rather than a networking header specifying an explicitly addressed destination. A specific form of implicit routing is one which focuses on routing eXtensible Markup Language (XML) documents based on XPath Expressions. For XML, refer to "Extensible Markup Language (XML) 1.0 (Third Edition)", W3C Recommendation 4 Feb. 2004, W3C (World Wide Web Consortium) and "Extensible Markup Language (XML) 1.1", W3C Recommendation 15 Apr. 2004, W3C (World Wide Web Consortium). For XPath, refer to "XML Path Language (XPath) Version 1.0", W3C Recommendation 16 Nov. 1999, W3C (Word Wide Web Consortium). For an XML Content router to function, it must perform the functions of XML parsing, XML filtering and forwarding, and conversion between various XML formats and semantics. Each of these involves a CPU intensive computational algorithm.

A small scale product can perform each of these functions in software. Projected data rates for such a product would be in the 50 to 200 Mbps region. Such a product is suitable for some network tasks; such as firewall/edge routing for a branch plant or small enterprise.

A product with slightly higher data throughput requirements, 1 to 2 Gbps, will require some or all of the parsing, filtering/forwarding, and conversion operations to be performed using some form of hardware acceleration. Such a product is suitable for deployment as an edge router for a corporate headquarters or large enterprise network.

For core networking applications, an XML router must support data rates in the range of 10 to 20 Gbps. To scale to these data rates, the XML router must incorporate multiple data plane forwarding elements, each based upon a HW accelerated data plane. Techniques are required to manage and distribute incoming XML traffic across the forwarding elements, to maximize the throughput of the system.

The products described above, although distinct in their HW architectures, have a common set of software requirements. These are largely identical to those defined for traditional carrier grade products such as Frame Relay or ATM switches, or IP routers. Among those requirements are:

1. Management applications (e.g. Simple Network Management Protocol (SNMP), Command Line Interface (CLI), Web Graphical User Interface (WebGUI))
2. Routing protocols. Examples of content routing protocols are XML Link State Protocol (XLSP) and XML Subscription Management Protocol (XSMP), both of which are components of Implicit Routing Protocol (IRP). Refer to co-filed application Ser. No. 60/530,615, the contents of which are herein incorporated by reference.
3. Security (SSL, authentication, XML filters)
4. Network troubleshooting
5. Performance monitoring.
6. Traffic engineering
7. Node serviceability, reliability and diagnostics.

To enable all three of the products to support this feature set in a common and cost effective manner, each must be implemented from a common software architecture and code base.

SUMMARY OF THE INVENTION

For a router using a mark-up language, such as XML, to be a viable networking device, hardware acceleration and parallelization techniques are required to achieve sufficient forwarding data rates. The present invention provides a system architecture which allows one or more of the above functions to be performed in hardware, with one or more hardware elements operating in parallel.

According to the present invention there is provided a carrier grade router for use in a content routed network, comprising a management plane for housing externally visible management applications, and coordinating and relaying external management requests to appropriate underlying application code in the router; a distinct control plane for running control protocols required within said mark-up language routed network; and a distinct data plane for receiving and forwarding customer data.

The mark-up language will normally be XML, although the invention would be applicable to other equivalent mark-up languages.

It will be seen that embodiments of the invention provide:
1. A software based architecture for a carrier grade XML router.
2. A method for optionally incorporating HW acceleration into the data plane of the XML router.
3. The use of multiple HW accelerated data plane forwarding elements in an XML router for the purpose of:
   Dramatically increasing XML forwarding performance and throughput.
   Increasing the capacity of the XML router in terms of the numbers of publishers, subscribers, and subscriptions supported.
4. A set of methods for load balancing XML traffic across multiple forwarding elements:
   Direct mapping of interface to forwarding element.
   Provisioned mappings of TCP sockets to forwarding elements.
   Provisioned mapping of XML documents to forwarding elements based on originating publisher(s).
   Provisioned mapping of XML documents to forwarding elements based on entitlement group(s).
   Dynamic mapping of XML documents to forwarding elements based on utilization and availability.
   Mapping of XML documents to forwarding elements based on a preliminary examination of the content.

The invention also provides a method of managing a carrier grade content router in a content based network, comprising providing distinct management, control, and data planes; coordinating and relaying external management requests to appropriate underlying application code in the router in said management plane, said management plane housing externally visible management applications; running control protocols required within a mark-up language routed network in said control plane; and receiving and forwarding customer data in said data plane.

BRIEF DESCRIPTION OF THE DRAWINGS

The invention will now be described in more detail, by way of example only, with reference to the accompanying drawings, in which.

DETAILED DESCRIPTION OF THE PREFERRED EMBODIMENTS

Figure 1:
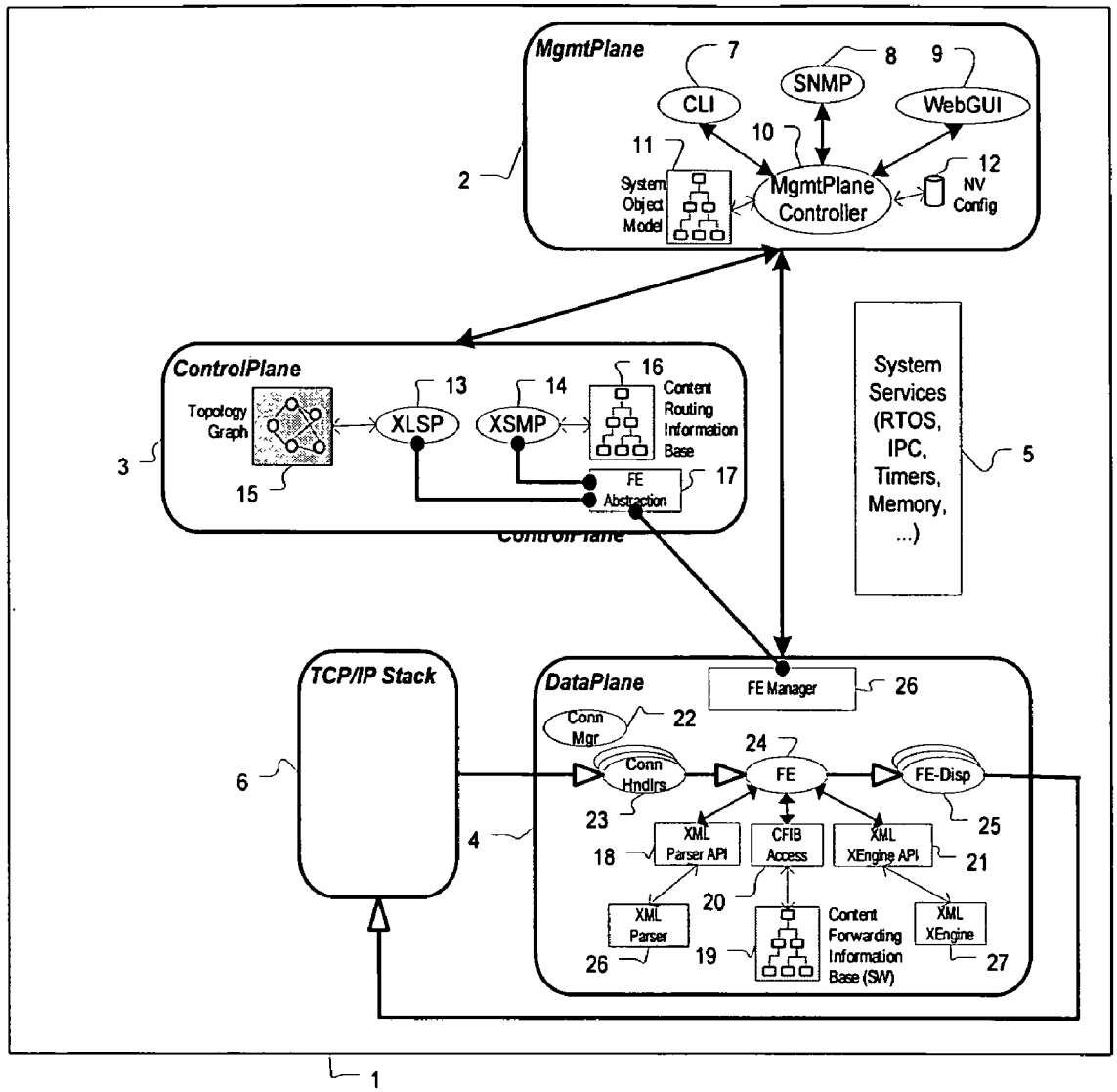
FIG. 1 shows the XML Router software Architecture.

FIG. 1 depicts a carrier class XML router employing a software based architecture 1. The architecture is sub-divided into three distinct "planes"; the Management Plane 2, the Control Plane 3 and the Data Plane 4. In addition, there are System Services 5, which consists of items such as a real-time operating system (RTOS), Inter-Process Communications (IPC), timers, memory management, and the like. Additionally, there is a TCP/IP protocol stack 6, as TCP over IP is preferentially used as the communications protocol between content routers. The roles and key design points of each plane will now be described.

The management plane 2 is responsible for two main functions:
1. Housing all externally visible management applications (e.g. CLI 7, SNMP 8, WebGUI 9).
2. Coordinating and relaying management requests from the external world (via CLI 7, SNMP 8, WebGUI 9, etc.) to the appropriate underlying application code in the router.

The first function is accomplished via straightforward implementations of the CLI/SNMP/WebGUI protocols, each in a distinct sub-system. All are designed to have a minimal understanding of the underlying architecture of the system, and rely on the MgmtPlane Controller (MPC) 10 to service management requests.

The second function is implemented in a sub-system called the MgmtPlane Controller 10. The primary responsibility of the MPC is to forward management responses and replies between the management applications (CLI 7/SNMP 8/WebGUI 9) and the other applications in the XML router. It performs this function in an abstracted, data driven design by consulting the System Object Model (SOM) 11. The SOM is an object oriented representation of the system. This includes both physical components (slots, ports, forwarder elements) and abstract entities such as protocols (XLSP, XSMP), XML router links, or subscription table entries. The MPC also manages the non-volatile (NV) configuration datastore 12. This datastore is the repository for configuration information so that the configuration (or other information such as systems logs, alarm logs, billing records, etc.) can be remembered across a system restart, including a loss of power. The MPC allows read and write access to the datastore 12, including support for transactions, and allows other operations such as backing up the datastore 12, restoring the datastore from a previous backup if necessary, and initializing the system using the information in the datastore.

The SOM 11 oriented design of the MPC 10 is a key aspect to the extensibility of the XML routed architecture. The SOM 11 defines a simple, self contained structure by which the physical architecture of the product is abstracted away from the management applications. By this technique, the CLI 7, SNMP agent 8 and WebGUI 9 implementations need have no design consideration for the different variants of XML router products described in below. The Management Plane 2 is also responsible for storing the configuration for the router in a non-volatile (NV) repository 12, so that upon a system restart (e.g. after a power failure), the configuration can be restored to the previously configured state.

The Control Plane 3 is responsible for running all control protocols required within an XML routed network (inter-router; between a publisher and a router; between a router and a subscriber). Currently, this consists of the implementation of two protocols; the XML Link State Protocol (XLSP) 13 and the XML Subscription Management Protocol (XSMP) 14. Note that XLSP and XSMP are fully described in the above-reference application Ser. No. 60/530,615.

The XLSP 13 is a protocol which discovers and monitors the topology of the XML routed overlay network. The XLSP 13 produces a topology graph (or topology information base) 15.

The XSMP 14 is a protocol which is responsible for registering and validating subscribers and publishers, processing subscription requests, and propagating subscription information throughout the network (such that forwarding of XML documents to the appropriate set of subscribers takes place). The XSMP maintains a copy of the forwarding database known as the Content Routing Information Base (CRIB) 16. Note that a subscriber is a computer or user who has expressed interest in some specific content, and a publisher is a computer or user that can insert content into the network.

All protocols designed and implemented within the Control Plane 3 are done so under the following constraints:
1. They must be capable of performing their operation with no "uploaded" information from the data plane. That is, no reliance on accessing data structures or processing algorithms within the data plane can be assumed.
2. Must communicate with the data plane exclusively through the "FE Abstraction" class 17.

These design constraints are imposed to insure independence of the control plane from the design and location of the data plane. As the software architecture migrates across each of the products described below, the control plane protocol implementations are unaffected. Variants of the FE Abstraction class 17 exists for each of the single FE Element and multiple FE Element architectures described below.

The Data Plane 4 is the component of the XML router which receives and forwards customer data. It is the single XML router component which varies greatly across the three architectures described below.

At a high level, the Data Plane 4 is responsible for four main tasks:
1. Terminating and de-muxing (ie separating control from data plane traffic) HTTP connections. Note that data plane and multiple control plane protocols can co-exist over a single HTTP connection, as per co-filed application Ser. No. 60/530,678.
2. Parsing XML documents via XML parser block 26 (accessed via the XML Parser Application Programming Interface (API) block 18) and searching the Content Forwarding Information Base (CFIB) database 19 for matching XPath Expressions. The CFIB 19 is accessed via the CFIB access block 20. The CFIB access block takes care of maintaining the contents of the CFIB 19 (e.g. adds and removes) as well as matching a received XML document against the contents of the CFIB 19. Note that XPath is used as the subscription language.

3. Performing document and application level transformations (eg applying XSLT transforms, converting from HTTP to SMTP, etc . . . ). This is handled by the XML Transform Engine (XEngine) block 27 which is accessed via the XEngine API block 21.

4. Multicast forwarding of a given document to possibly multiple downstream routers as well as locally connected subscribers interested in the said document.

Each of these functions is computationally intensive, and relates directly to the performance of the XML router. Correspondingly, each task is a candidate for performance speed-ups by using a companion HW accelerator, as described below.

In a software only architecture, the data plane consists of five key components; the Connection Manager 22 and associated Connection Handlers 23, the Forwarding Engine (FE) 24, the XML Parser 26 with the associated XML Parser API 18, the Content Forwarding Information Base (CFIB) 19 with the associated CFIB access block 20, the XML Transform Engine (XEngine) 27 with the associated XML XEngine API 21, and the FE Dispatcher (FE-DISP) 25.

The ConnMgr 22 and ConnHndlrs 23 are threads which are responsible for managing and terminating HTTP connections, and parsing HTTP headers for de-multiplexing control plane traffic from the data plane flows (refer to 60/530,678). Note that control and data plane messages may be received from a single HTTP connection.

The FE 24 is the thread which is responsible for coordinating the parsing, lookup and transformation of the XML document. It houses the XML Parser subsystem (18 and 26), the CFIB subsystem (19 and 20), and the XEngine subsystem (21 and 27), which are responsible for parsing, lookups and transforms respectively. The FE 24 is designed to account for the scenarios in which these components are performed in hardware. It handles documents in a pipelined manner, allowing multiple documents to be in process at each stage at any one time (the hardware variants of these objects utilize pipelining to increase overall throughput). And the interface to each component is asynchronous in nature; that is, the document is dispatched to the object, and the FE 24 continues processing a subsequent document without blocking, with the results of the first document being returned to the FE 24 via an asynchronous call back.

As the data plane design migrates across the three product architectures, it is critical that the remaining components of the system (i.e. control plane 3 and management plane 2 applications) are minimally affected. It is a requirement for the three product architectures to be constructed from a single code base, so the operation of the control plane 3 and management plane 2 applications must be isolated from the data plane 4 implementation. This is accomplished within the "FE Manager" 26 object, which presents a single common interface to the remainder of the system. The FE Manager is responsible for directing requests to add, delete or retrieve subscribers, publishers and subscription entries from Content Forwarding Information Base 19. It also presents an interface for retrieving data plane statistics (e.g. documents and bytes forwarded, documents discarded, HTTP formatting errors, etc . . . ).

Figure 2:
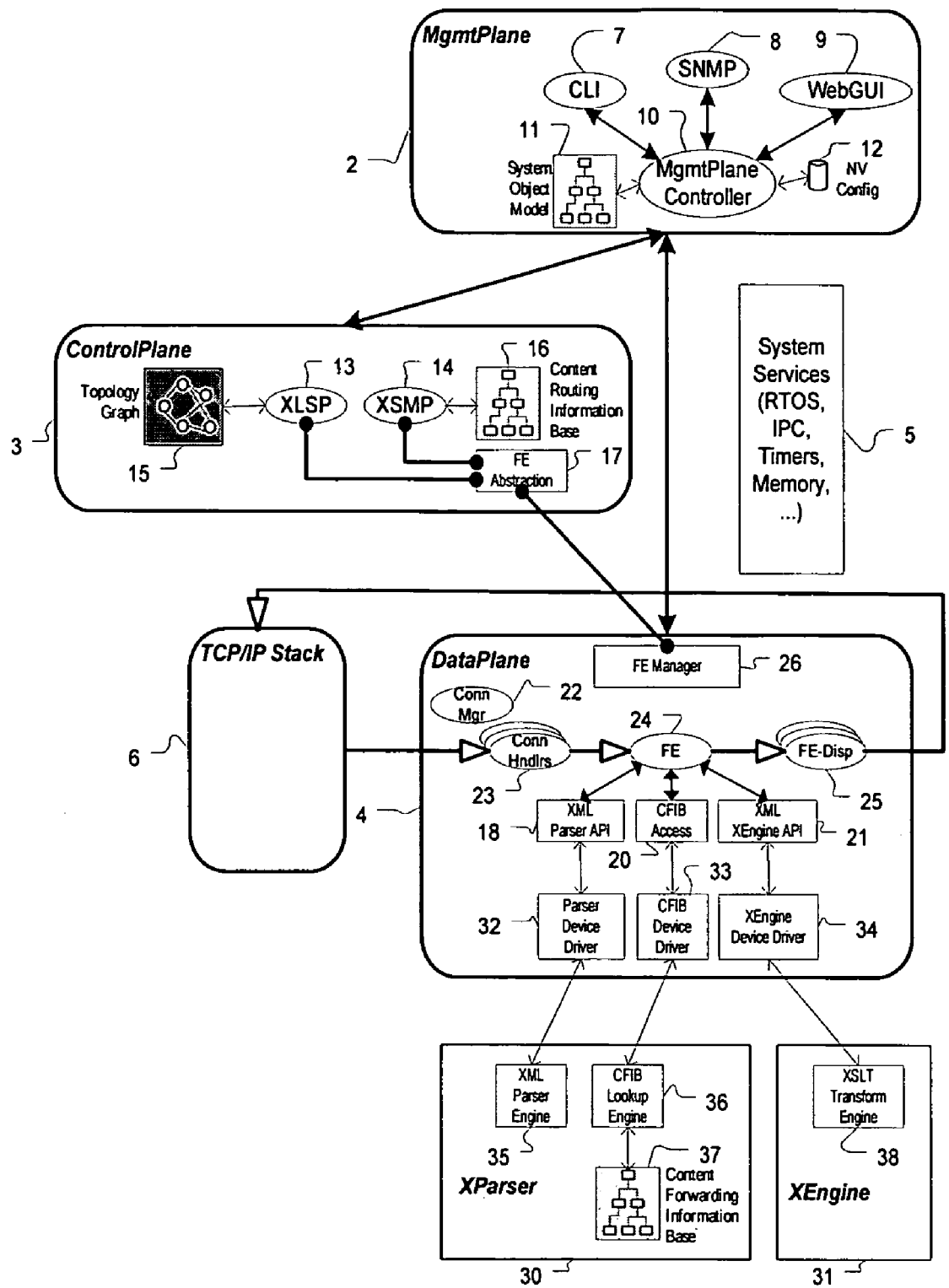
FIG. 2 illustrates a Hardware Accelerated XML Router Dataplane.

As the XML router scales to speeds in the 1 to 2 Gbps range, some of the repetitive and CPU intense components of the data plane must be moved into hardware acceleration. Specifically, the XML Parsing function 26 and CFIB 19 lookup functions are implemented within a single hardware device (which may utilize one or more Field Programmable Gate Array (FPGA), and/or Application Specific Integrated Circuit (ASIC), memories, etc.) known as the XParser. Similarly, a subset of XML transform functionality 27 is implemented in the XEngine hardware device. The design of the data plane sub-system in this scenario is depicted in FIG. 2, showing the XParser 30 and the XEngine 31. Note that elements of FIG. 2 in common with FIG. 1 share the same labels. Note that the XParser 30 and the XEngine 31 may be implemented on the same or different hardware assemblies within the router.

This migration of the data plane from a strictly software to hardware accelerated design is accomplished via OO (Object Oriented) inheritance techniques. In the software only architecture, the subsystems for the XML Parser (18 and 26 of FIG. 1) and CFIB (20 and 19 of FIG. 1) and the XEngine (21 and 27 of FIG. 1) are separated into two classes or blocks, access classes (providing access methods, also known as API) and derived classes which actually perform the algorithm. In the hardware architecture, the derived class performs a device driver function; that is it passes info to/from the hardware device as necessary. The access class remains the same in both instances, and the interface between the FE 24 and the access class is identical in both the software and hardware implementations. In FIG. 1, for the software only implementation of the Parser, CFIB and XEngine functions respectively, the access classes are shown in blocks 18, 20 and 21, and the derived classes, which perform the actual algorithm or function, are shown in blocks 26, 19, and 27 respectively. For the architecture with hardware acceleration shown in FIG. 2, the access classes for the Parser, CFIB and XEngine respectively remain as blocks 18, 20 and 21, and the derived classes, which in this case perform device driver functions to interact with the hardware components, are shown in blocks 32, 33 and 34 respectively. In FIG. 2, within the XParser hardware 30, is the XML Parser Engine 35, the CFIB Lookup Engine 36, and the CFIB 37. Within the XEngine hardware 31 is the XSLT Transform Engine 38.

Figure 3:
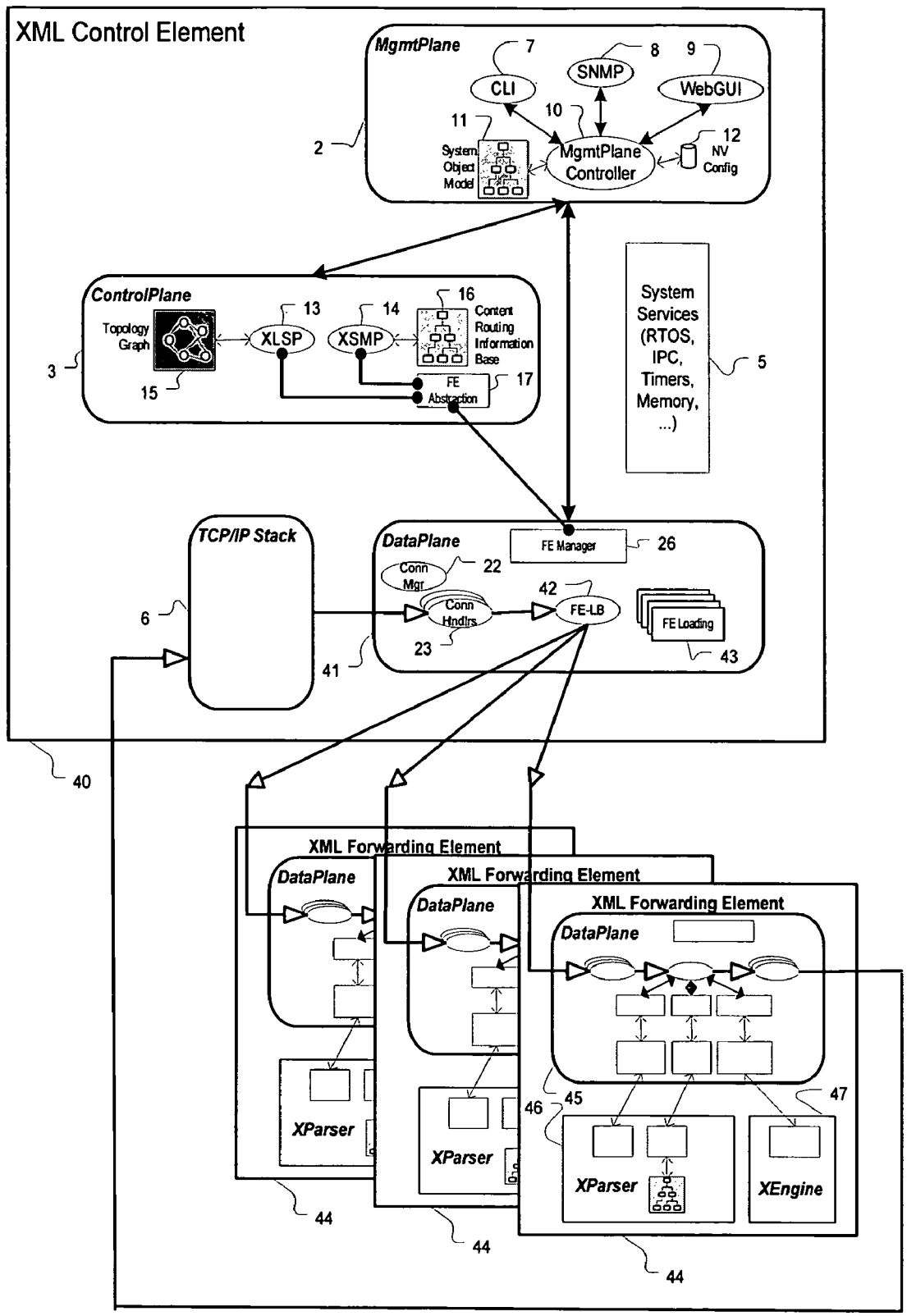
FIG. 3 shows Multiple Forwarding Elements.

To further scale the XML Router to 10 Gbps to 20 Gbps speeds, it is necessary to incorporate multiple data planes, each one being considered a "Forwarding Element". The system architecture for this size router is depicted in FIG. 3. The implementation of each Forwarding Element in this architecture is identical to the single data plane design in FIG. 2. In FIG. 3, each Forwarding Element 44 is instantiated on a distinct hardware entity, which is separate from the other Forwarding Elements, and separate from the Control Element 40 which executes on a centralized hardware entity The exact number of Forwarding Elements in the system is a function of desired capacity versus system cost. For the purposes of this document, it is sufficient to state that there are N Forwarding Elements, and all N are equal in terms of forwarding and subscription capacity. However, in the future, as new versions of XML forwarding elements are introduced to the system, the newer versions may have enhanced performance or capacity which must be taken into account by the controlling logic.

In FIG. 3, elements in common with FIG. 2 share the same label. In FIG. 3, the XML Control Element 40 contains the Management Plane 2, the Control Plane 3, the System Services 5, and the TCP stack 6 in the same manner as previously described, along with constituent elements such as Control Plane 3 protocols XLSP 13 and XSMP 14, and Management Plane 2 entities CLI 7, SNMP 8, and WebGUI 9. Within the XML Control Element 40, the DataPlane 41 has a reduced role. It still contains the Connection Manager 22 and Connection Handlers 23 and FE Manager 26 as previously described. However, the main dataplane functions such as parsing, content matching and content transformation have been distributed to the plurality of XML Forwarding Elements 44.

It should be noted that the Multiple Forwarding Element architecture can be used to increase scalability of the system across several axes:
1. Forwarding throughput.
2. Number of concurrent subscribers, publishers and subscriptions.
3. System availability (i.e. use of Forwarding Elements in a redundant fashion).

A key question in the design of this architecture is the question of how incoming XML data is assigned to a particular forwarding element. As can be seen in FIG. 3, a new data plane software component has been introduced, the FE-Load Balancer (FE-LB) 42, specifically to perform this task. There are a number of alternatives for load balancing across the Forwarding Elements 44:
1. Interface Load Balancing
2. Socket Based Load Balancing
3. Publisher Based Load Balancing
4. Entitlement Group Load Balancing
5. Dynamic Usage Based Load Balancing
6. Preliminary Content Inspection Based Load Balancing The method used is configurable by the network administrator, to optimize the behavior of the XML router for his specific network and application. The characteristics and further details on each load balancing algorithm are presented below.

Interface Based Load Balancing is based on a static mapping of physical interfaces to Forwarding Element. That is, all traffic received on a given interface is automatically directed to a specific Forwarding Element. This method of load balancing is the simplest, and potentially yields the highest system throughput, because there is no intermediary between the interface and the Forwarding Element (i.e. traffic need not touch the Control Element).

This is also a good method for yielding a high availability system, as N:1 and 1:N interface to Forwarding Element redundancy schemes are easily and efficiently realized. That is, the interface to Forwarding Element mappings can quickly be changed in the event of a Forwarding Element failure.

However, this method does not improve the scalability of the system with respect to the number of publishers/subscribers/subscriptions. This is due to the connectionless nature of the underlying IP network; packets from a given publisher or destined to a given subscriber can be received from any physical port. Hence, the CFIB tables on each Forwarding Element must be identical, and fully populated with the complete topology information.

Socket Based Load Balancing is based on a static mapping of sockets (or XML static links between routers) to Forwarding Element. That is, all traffic received on a given XML link is automatically direct to a specific Forwarding Element 44. This method of load balancing is only marginally more complex than Interface Based Load Balancing, and in some network topologies may yield similar throughput gains.

However, because of the connectionless nature of IP, it is possible for a large number of the routers sockets to be isolated to a small number of physical interfaces, thereby skewing the load on a small number of Forwarding Elements (and leaving other Forwarding Elements under utilized).

Similar to Interface Based Load Balancing, Socket Based Load Balancing allows a simple redundancy scheme, as the mappings from socket to Forwarding Elements 44 can be changed quickly. The Socket Based Load Balancing, like the interface-based load balancing, requires the CFIB tables on each Forwarding Element must be identical, and fully populated with the complete topology information.

In a scheme using Publisher Based Load Balancing, the incoming XML document is dispatched by the Control Element 40 to a Forwarding Element 44 based on the Publisher Id stored in the meta-tag associated with the document, as explained in co-filed application Ser. No. 60/530,677, the contents of which are herein incorporated by reference. The network administrator would be required to statically configure the publisher to Forwarding Element 44 bindings (typically based on his knowledge of the expected volume of traffic from a given publisher). The throughput improvement for the Publisher Based Load Balancing would vary greatly depending on the traffic patterns in the network. For networks with evenly distributed traffic generation across a number of publishers, it would be easy for the administrator to optimally distribute publisher to Forwarding Element mappings. For networks with unpredictable or clumped traffic distributions across the publishers, the performance increase would be less deterministic.

The capacity of the XML router could be greatly increased by isolating the CFIB entries related to a given publisher to a single Forwarding Element 44. One scheme of doing this is if a publisher declares the type of documents to be published (for example, based on top-level XML elements that describe the type of document, such as stock quotes vs. news articles vs. purchase orders; or based on the XML Document Type Definition (DTD) or schema to be published against). An alternative method is to provision this information on the router instead of it being dynamically determined from the publisher. Then, when one or more publishers are assigned to a given Forwarding Element, only subscriptions related to the type of documents produced by the publishers need to sent to the Forwarding Engine, reducing the number of subscriptions that the Forwarding engine needs to deal with. A downside of this scheme is that a publisher is not free to publish any sort of XML content; if a new type of content not previously declared is to be published, the publisher has to declare that it will be publishing this new document type, resulting in the router additionally downloading to the Forwarding Engine assigned to the publisher any subscriptions that now relate to the new content type. However, the benefit of increased capacity is offset by a slower switchover rate when using the Publisher Based Load Balancing scheme in a redundant configuration. That is, when a Forwarding Element 44 servicing traffic from a given publisher fails, and that traffic is moved to a new Forwarding Element 44, all the CFIB entries for that publisher will need to be downloaded to the new Forwarding Element 44. This process could take several milli-seconds, depending on the size of the publisher CFIB.

With the Entitlement Group Load Balancing scheme, the incoming XML document is dispatched by the Control Element 40 to a Forwarding Element 44 based on the Entitlement Group stored in the meta-tag associated with the document. Entitlement Groups are explained in co-filed application Ser. No. 60/530,677. The network administrator would be required to statically configure the entitlement group to Forwarding Element 44 bindings (typically based on his knowledge of the expected volume of traffic from a given entitlement group or based on other policies, such as the need to isolate certain entitlement groups from each other by using different Forwarding Engines).

With entitlement groups, subscribers are also associated with one or more entitlement groups, and thus so are their subscriptions. As a result, when a given Forwarding Engine is assigned one or more entitlement groups to handle, the associated subscriptions from the network for those entitlement groups can be associated with the Forwarding Element. Thus, a given Forwarding Element only sees the subscriptions for the entitlement groups it is handling, leading to better scalability and performance. In addition, this provides isolation among entitlement groups (or sets of entitlement groups), which is important when providing services such as virtual private networks. Upon a switchover from a failed Forwarding Element to a backup Forwarding Element, the correct set of subscriptions to be matched against must be sent to the new Forwarding Element.

Figure 4:
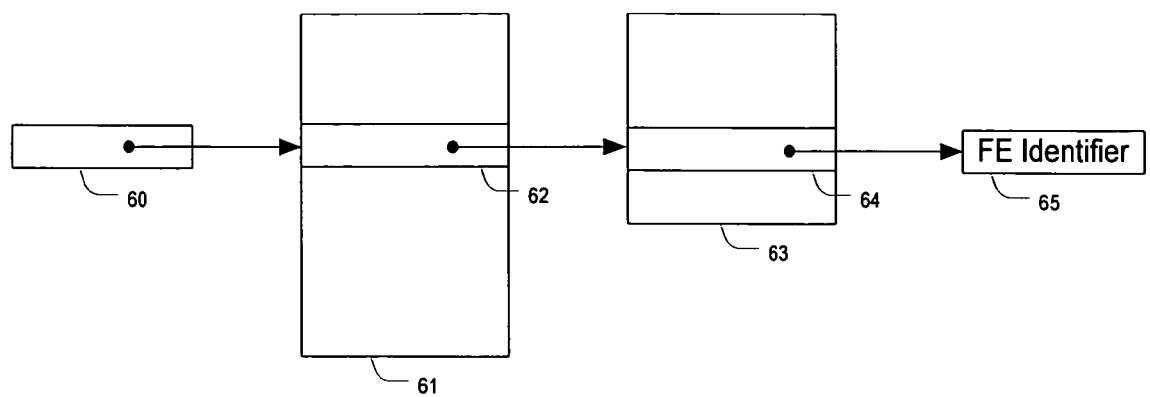
FIG. 4 shows a static load balancing scheme.

With the above static load balancing schemes based on interface, socket, publisher id, or entitlement group, the lookup can use a simple table-based approach, where the input discriminator (one of interface, socket, publisher id, or entitlement group) is used to index into a table to yield the Forwarding Element to use. Other lookup techniques, such as a hash lookup, can also be used. For redundancy support, the lookup can yield a logical Forwarding Element identifier, which is then used to lookup in a second table to find the identifier of the physical Forwarding Element to use. Thus, when a switchover occurs, only one entry in the logical to physical Forwarding Element table need be updated, vs. a potentially large number of entries in the first lookup table (for example, indexed by publisher id). This is illustrated in FIG. 4. The input discriminator 60 used for the static load balancing scheme (such as the interface, socket, publisher id, or entitlement group) is used to index into a lookup table 61 (by doing a direct index operation, or by using a scheme such as a hash table lookup). The resulting entry 62 indicates the logical Forward Element unit to use. This value is used to index into a second lookup table 63 and the resulting entry 64 yields the Forwarding Element identifier 65 which indicates which Forwarding Element is to be used for the document. If a Forwarding Element fails, only the single entry in the table 63 needs to be modified to indicate the new Forwarding Element to use. Note that many entries in lookup table 61 can point to the same entry (e.g. 64) in the second lookup table 63.

A more sophisticated scheme for distributing traffic across the Forwarding Elements 44 is the Dynamic Usage Based Load Balancing method. Under this approach, the FE-LB 42 dynamically tracks the loading of each Forwarding Element (keeping the information in the FE Loading data store 43) and distributes new documents to that which is least loaded.

It should be noted that the processing time for a single XML document is non-deterministic, as it is affected by document size, size of the CFIB, and level of nesting of the XML elements which eventually yield the CFIB lookup results. This characteristic results in a simple, round robin load balancing scheme being ineffective.

A further description of the Dynamic Usage Based Load Balancing method:

1. Each Forwarding Element 44 is designed such that it can process a maximum of N XML documents in its forwarding pipeline at one time.
2. Periodically, each Forwarding Element 44 sends a message to the FE-LB 42 on the Control Element 40 containing the number of "free slots" (ie N-X, where X is the current number of documents being processed by that Forwarding Element).
3. The FE-LB 42 tracks the number of free slots available on each Forwarding Element 44, and maintains a linked list in sorted order, such that the Forwarding Element at the head of the list is that with the most unused slots.
4. When the FE-LB 42 needs to select a Forwarding Element 44 to send a document to, it chooses the element at the head of the list, decrements its free slots counter by 1, and moves it to the correct position in the sorted list.
5. If it is completely busy (ie no free slots), a Forwarding Element 44 can choose to not send the "free slots" message. Non-receipt of a "free slots" message from a Forwarding Element 44 within some time period T, causes the FE-LB 42 to assume the Forwarding Element 44 is busy and move it to the end of the sorted list.

The Dynamic Usage Based Load Balancing algorithm is a strong scheme for optimizing the usage of forwarding elements 44, and therefore should yield a high throughput regardless of network topology and traffic patterns.

However, because a given XML document could be dispatched to any Forwarding Element 44, it is necessary that each Forwarding Element 44 maintain a complete copy of the entire CFIB. No increased scalability of the XML router's capacity for publishers, subscribers and subscriptions is achieved.

The Dynamic Usage Based Load Balancing scheme yields a simple and efficient mechanism for Forwarding Element 44 redundancy. When a Forwarding Element 44 fails, the FE-LB 42 simply removes it from its linked list, such that it will not be chosen for subsequent XML documents. No downloading of CFIB updates is required.

The various Load Balancing schemes can be combined. For example, the Dynamic Usage Based Load Balancing can be combined the Entitlement group Based Load Balancing. Consider a system with six Forwarding Elements, where two Forwarding Elements are assigned to an entitlement group (or an entitlement group set), and the other four Forwarding Elements are assigned to a different entitlement group (or different entitlement group set). As explained above, each Forwarding Element would be given only the subscriptions involved in the entitlement group(s) that it is handling. The Dynamic Load Balancing scheme would track the number of free slots on each Forwarding Element as described above, but would keep the list described above for each group of Forwarding Elements instead of only having a single list. Thus, for a given entitlement group (or set of entitlement groups), the Dynamic Usage Based Load Balancer would balance the traffic among the associated set of Forwarding Elements.

The Preliminary Content Inspection Based Load Balancing scheme is the most subtle of the available schemes. In this method, the FE-LB 42 on the Control Element 40 performs a quick parse and lookup operation on the XML document, and forwards it to the appropriate Forwarding Element 44 based on that result. Typically the first pass parse and lookup would only filter based on a simplified CFIB, such as examining top level elements, or searching for a small set of element names. For example, the top level examination might separate documents based on whether they contain news, financial quotes, or SOAP messages. Such an initial parse can be used with a very simplified XML parsing engine which does not do any XML conformance or validity checks (for example, checking to see if the XML document is well-formed and valid as per the XML specification). A parser with an event interface, such as a SAX parser (known in the art) with very simplified parsing rules, could be used for this preliminary content inspection. Moreover, if very simple checks such as only using the top-level XML tag are used, then the simplified parsing can stop as soon as the top-level tag is found and checked. The selected Forwarding Element, as part of its parsing function, will do the full conformance and validity checks on the XML document.

The benefit of the Preliminary Content Inspection Based Load Balancing scheme is the ability for the administrator to tune and optimize the router performance for a given family of traffic, publishers and subscribers. In the example above, the financial quote data could be dispatched to a number of isolated Forwarding Elements 44, guaranteeing a certain level of throughput and service. Similarly, the administrator can partition the CFIB resources in the system based on the preliminary inspection. That is, the number of subscription entries for a given family of traffic (eg. News, financial quotes, SOAP messages) are managed by the mapping of each class to Forwarding Elements 44.

The Preliminary Content Inspection Based Load Balancing method may or may not yield a significant increase in XML router capacity, depending on the nature and content of the CFIB, and how XML documents are separated in the first pass.

The Preliminary Content Inspection Based Load Balancing method also does not lead to strong performance in the case of a redundancy switchover. All CFIB entries for a failed Forwarding Element 44 will need to be downloaded to a new Forwarding Element 44.

It should also be noted that in FIG. 3, functions such as the TCP/IP stack 6, and other portions of the dataplane 41 such as the connection manager 22, connection handlers 23, the FE-LB 42 and the FE loading data store 43 could themselves be implemented in specialized hardware, allowing for the complete datapath to be implemented in hardware. The FE Manager 26 would abstract this from the management plane 2 and the control plane 3.

The invention has been described with reference to an exemplary embodiment. It will be appreciated by persons skilled in the art that many variants are possible within the scope of the invention.

All references mentioned above are herein incorporated by reference. Reference has been made herein to copending provisional applications, which are incorporated by reference. Such incorporation by reference should also be taken to include the non-provisional applications based thereon whose serial numbers will be inserted when they become available.

We claim:

1. A carrier grade router for use in an XML content-routed network wherein XML documents are routed through the XML content-routed network using XML markup language by matching content of the XML documents with subscriptions distributed through the network with an XML subscription management protocol, comprising:

a management plane for running management applications, and coordinating and relaying external management requests to appropriate management applications in the router;

a separate and distinct control plane for running an XML link state protocol to discover and monitor the topology of the XML content-routed network and the XML subscription management protocol to register and validate publishers and subscribers; and a separate and distinct data plane for receiving and forwarding customer data, wherein said data plane is responsible for the following tasks: terminating and separating control from data plane traffic in HTTP connections; parsing XML documents and searching the content forwarding information database for matching XPath Expressions; and performing document and application level transformations and the muiticast forwarding of individual documents; and wherein said data plane comprises:

a common forwarding element manager for presenting a common interface from said data plane to said management plane and said control plane, a plurality of XML forwarding elements in the router, each containing a content routing information base and instantiated on a distinct hardware entity, which is separate from other forwarding elements, for performing parsing, content matching and content transformation of incoming XML documents in parallel prior to forwarding said XML documents through the network, and a load balancer for assigning incoming XML documents to each of said XML forwarding elements so as to distribute said incoming XML documents among said XML forwarding elements in accordance with a predetermined load balancing scheme.

2. The router of claim 1, wherein said management plane is configured to coordinate and relay said management requests via a management plane controller that forwards management requests and responses between management applications and other applications in said content router.

3. The router of claim 1, wherein XML parsing functions and content forwarding information database lookup functions are implemented in the companion hardware accelerator.

4. The router of claim 3, which is configured to permit access to the data plane components from the rest of the system through software abstraction techniques to allow other software subsystems to be independent of the data plane being implemented in hardware or software.

5. The router of claim 1, wherein said load balancer is configured to perform load balancing by one or more methods selected from the group consisting of: interface load balancing; socket based load balancing; publisher based load balancing; entitlement group load balancing; dynamic usage based load balancing; and preliminary content inspection based load balancing.

6. The router of claim 5, comprising at least one lookup table for identifying a forwarding element to use.

7. The router of claim 6, wherein said at least one lookup table comprises a first lookup table storing a logical element identifier and a second lookup table storing a physical forwarding element identifier, and whereby said logical forwarding element identifier is used to find the physical forwarding element identifier in said second table so that when a switchover occurs only an entry in the second lookup table need be updated.

* * * * *